Oct. 31, 1961 V. F. DAHLGREN ET AL 3,007,131

ELECTRICAL CONNECTOR FOR FLEXIBLE LAYER CABLE

Filed Aug. 29, 1957

Victor F. Dahlgren

Sidney K. Tally

INVENTORS 3,007,131

ELECTRICAL CONNECTOR FOR FLEXIBLE LAYER CABLE

Victor F. Dahlgren, West Windham, and Sidney K. Tally, Nashua, N.H., assignors to Sanders Associates, Inc., Nashua, N.H., a corporation of Delaware Filed Aug. 29, 1957, Ser. No. 681,050
3 Claims. (Cl. 339—198)

This invention relates to electrical connectors, such, for example, as are used to connect conductive cables one to another or those used as rack and panel connectors. More particularly, this invention is directed to electrical connectors for connecting wide, thin printed circuit types of cables, especially cables having more than one layer of conductors.

Flexible printed circuit cables are made in the form of thin, flat conductive strips of copper laminated to supports of flexible thermoplastic insulating material. These cables maintain the copper-foil strips in fixed patterns spread primarily in a single, thin plane. The terminations of these conductors are maintained in a definite spatial relationship in this plane, thereby facilitating connection to connectors having terminals with mating space relationship. As long as the conductors are utilized in the single, thin plane there is little difficulty in mating the conductor terminations to connector terminals and soldering them in this position. However, when high conductor density is required and there are width limitations to the flexible cabling that may be employed it becomes necessary to laminate groups of these conductors in different vertical planes. In other words, the flexible cables of conductors are stacked one above the other, preferably with the terminations for the different layers extending one beyond the other and, additionally, staggered with respect to those in adjacent layers. Cables of this type are neatly formed and efficiently solve the conductor density and cable width problems. However, stacking of cables in the manner described introduces the problem of attaching the conductor terminations to the proper terminal pins of a connector. If conventional connectors are employed, the stacked conductor terminations appear one above the other with only a few thousandths of an inch vertical separation. This makes it extremely difficult to provide any simple means of connecting to the stacked terminations. If the conductor terminations in the different layers are staggered in length and connectors having rows of terminals are employed, then the stacking of the conductors makes it difficult to seat the upper layers of conductor terminations onto any conventional connector having terminal pins all at the same level. The upper layers of conductor terminations are spaced from the level at which the lowest layer occurs and it is difficult to bend these upper layers down to seat in the same plane as the lower layer. The present invention provides an electrical connector which solves the problem of connecting to printed circuit cables as described above having many layers of closely spaced conductors.

It is therefore an object of the present invention to provide a new and improved electrical connector for wide, thin flexible cables having many layers of closely spaced conductors.

It is a further object of the present invention to provide a connector for such cable which is simply and easily connected to the many layers of the flexible cabling.

It is also an object of the present invention to provide an electrical connector having stable mechanical and electrical features for facilitating the connection of a multi-layer flexible cable thereto.

A still further object of the present invention is to provide an electrical connector which provides for an unusually high number of conductor terminations in a small space.

In accordance with the present invention there is provided an electrical connector comprising a base of insulation material having one surface with a plurality of stepped levels, and a plurality of terminals extending from said surface in rows, at least one row for each of said levels, the tops of said terminals on adjacent rows occurring at different levels.

For a better understanding of the present invention, together with other and further objects thereof, reference is made to the following description taken in connection with the accompanying drawings and its scope will be pointed out in the appended claims.

Figures 1, 2:
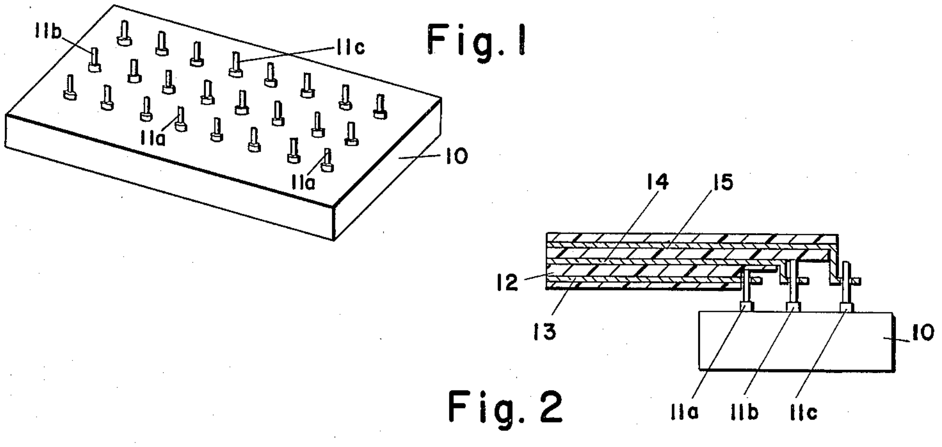
FIG. 1 is a perspective view of the terminal section of a conventional multi-terminal conductor.
FIG. 2 represents the coupling of a multi-layer printed circuit cable to the electrical connector of FIG. 1.

*Description and explanation of the connector of FIG. 1 and coupling of a cable thereto as in FIG. 2*

FIG. 1 represents a conventional multi-terminal electrical connector having an insulating base 10 and a plurality of terminals 11 shown in three rows. The size of this connector, the number of terminals employed and the number of rows of terminals are unimportant with respect to the present invention. It is sufficient that the connector have at least two rows of terminals and that the terminal density be such that it is difficult to connect printed circuit cabling as represented by the cable 12 in FIG. 2 to the connector. Considering the cable connection represented in FIG. 2, it is obvious that the cable 12 having three layers 13, 14 and 15, each with its group of conductor terminations does not simply mate with the connector 10 and terminals 11. The lower layer 13 can be simply arranged to seat on the surface of the connector 10 and be electrically connected to the terminals **11*a* by soldering. However, the layers 14 and 15 can not be made to seat onto connector body 10 in the vicinity of the rows of terminals 11*b* and 11*c*, respectively, without forcibly pushing the layers 14 and 15 down into contact with the body 10. Such pushing results in a bend of the layer 14 at the level of the top of the terminals 11*a* and results in a bend in the layer 15 at the level of the top of the terminals 11*a* and 11*b*. This bending is not only injurious to the cable, probably resulting in future failure if not immediate failure, but also creates a situation where the tops of the terminals 11*a* are being forced into the layer 14 and the terminals 11*b* are being forced into the layer 15**. This situation can result in eventual protrusion of these terminals into the upper layers resulting in improper electrical connections and short-circuiting. Thus, a cable connection such as represented in FIG. 2 is not only difficult to make with conventional connectors but in addition is impractical in view of the mechanical and electrical problems introduced.

Figure 3:
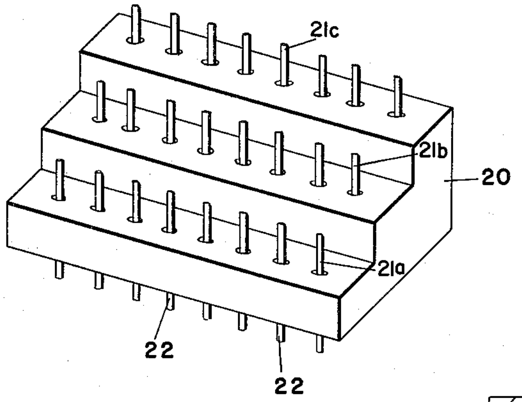
FIG. 3 represents a perspective view of a multi-terminal electrical connector in accordance with the present invention.

*Description of electrical connector of Fig. 3 and its utilization with multi-layer cabling*

The connector of FIG. 3 includes a body 20 having a plurality of rows of terminals **21*a*–21*c*. This connector differs from the connector of FIG. 1 in that the terminals in the row 21*a* are shorter in length than the terminals in the row 21***b* and the terminals in 21*b* are shorter in length than the terminals in the row 21*c*. In addition, the rows 21*a*, 21*b*, and 21*c* have bases which are staggered in height forming, from a side view, a stair or step appearance.

Figure 4:
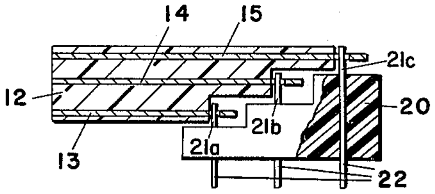
FIG. 4 indicates the manner in which the flexible cabling, such as represented in FIG. 2, is coupled to the improved connector.

The cable 12, discussed with respect to FIG. 2 above, mates simply and easily with the terminals at the different levels in the connector of FIG. 3 as shown in FIG. 4. The lower layer 13 mates with the terminals in row 21*a* and the layers 14 and 15 mate with the terminals in rows 21*b* and 21*c*, respectively. It is to be noted that there are no deforming pressures or forces placed on the cable during the process of connection to the connector 20. The layers of cable simply and easily terminate in proper vertical and horizontal spatial relationship to the corresponding terminals on the connector 20. The connector 20 includes pins 22 in rows corresponding to the rows 21*a*, 21*b*, and 21*c*. Pins 22 connect with the corresponding terminals and cooperate with a mating connector, not shown, to provide interconnection of circuits.

While applicants do not intend to be limited to any particular number of terminals, terminal size, terminal configuration or connector configuration, in the embodiments of the invention just described, there follows a set of specifications providing material description and dimensions for a connector found to be highly practical in utilizing the concepts of the present invention.

| | |
|---|---|
| Number of terminals | 50 |
| Number of rows of terminals | 4 |
| Width of base ____ inches | ¾ |
| Length of base in terminal area ____ do | 2 |
| Over-all thickness of connector ____ do | ⅞ |

The pins are of copper and the base is phenolic.

Spacer 40 is 2 inches long and ¾ inch wide, with a lower step of ¹⁄₁₆ inch, and the upper step of ⅛ inch height.

While there has been described what is at present considered to be a preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A cable and connector assembly comprising a connector body of non-conductive material having stepped surfaces stepped in the direction of the cable attached thereto, pins extending from the bottom of said body for connection with a mating connector, said pins communicating with terminals projecting in rows from said stepped surfaces, said cable having a plurality of layers of conductors spaced by insulating material, said layers of conductors being stepped to mate with said stepped surfaces, said conductors having exposed terminations electrically and mechanically connected to said terminals.

2. A cable and connector assembly comprising a connector body of non-conductive material having surfaces stepped downwardly in the direction of the cable attached thereto, pins extending from said body for connection with a mating connector, said pins communicating with terminals extending upwardly in rows from said stepped surfaces, said cable having a plurality of layers of conductors spaced by insulating material, said layers of conductors being stepped to mate with said stepped surfaces, said conductors having exposed terminations electrically and mechanically connected to said terminals.

3. A cable and connector assembly comprising a connector body of non-conductive material having rows of progressively deeper recessed surfaces stepped downwardly in the direction of the cable attached thereto, pins extending from said body for connection with a mating connector, said pins communicating with terminals extending upwardly in rows from said recessed surfaces, said cable having conductor terminations in a plurality of planes to mate with said surfaces, said terminations being exposed and electrically and mechanically connected to said terminals.

References Cited in the file of this patent

UNITED STATES PATENTS

| | | |
|---|---|---|
| 2,437,358 | Mowery | Mar. 9, 1948 |
| 2,651,833 | Kernahan | Sept. 15, 1953 |
| 2,766,436 | Luebking | Oct. 9, 1956 |

FOREIGN PATENTS

| | | |
|---|---|---|
| Add. 69,606 | France | June 28, 1958 |

OTHER REFERENCES

Sanders: Electronics, December 1955, page 313.

Heck, C. R.: Electrical Mfg., November 1956, pages 126, 127.